Patented Nov. 28, 1939

2,181,478

UNITED STATES PATENT OFFICE 2,181,478

HEAT STABLE VINYL RESIN COMPOSITIONS

Kermith K. Fligor, Lakewood, Ohio, assignor to Carbide and Carbon Chemicals Corporation, a corporation of New York No Drawing. Application December 22, 1936,
Serial No. 117,181

7 Claims. (Cl. 260—86)

The invention relates to vinyl resins of improved heat stability and to compositions containing the same. It is particularly concerned with novel heat stabilizing materials which incorporated with compositions of vinyl resin will substantially increase resistance of the resin to deterioration at elevated temperatures.

Vinyl resins as formed by the polymerization of many vinyl compounds are well known in the art as a source of synthetic resinous bodies, and their particular properties adapting them for use in a variety of plastic compositions have been recognized. In the processing of such resins into molded and extruded articles, or as a constituent in certain surface coatings and finishes, subjecting of the resinous composition to various degrees of heat treatment is quite essential. Under these conditions, as well as at elevated temperatures which may be encountered in ordinary commercial use of the plastic, precautions are necessary to prevent resin deterioration which is evidenced by a discoloring, or even complete decomposition and blackening of the plastic mass. It is generally acknowledged that vinyl resins are susceptible to heat deterioration, and many suggestions have been made to improve stability in this respect.

The present invention is applicable to resinous compositions comprising vinyl resins which contain vinyl halide. It is particularly concerned with vinyl resins such as may be formed by conjoint polymerization of a vinyl halide with a vinyl ester of an aliphatic acid. This type of resin is disclosed in United States Patent No. 1,935,577, to E. W. Reid, and includes the conjoint polymer of vinyl chloride and vinyl acetate containing therein about 60% to 95% by weight of vinyl chloride, to which resins this invention is especially applicable. In the compounding and processing of these vinyl resins it has previously been found that heat stability can be improved by incorporating with the resin certain stabilizing materials. Among numerous compounds suggested for this purpose stearic acid salts of metals such as cadmium, lead or calcium have shown particularly acceptable stabilizing action, and are now being used in this capacity.

In accordance with my invention, I also employ an additive stabilizing material, an essential component of which is a metal stearate. I have found, however, that in admixture with cadmium, lead or calcium stearates, minor amounts of certain alkali metal salts will function as an adjuvant, and in conjunction therewith will substantially increase and improve the heat stability of resin compositions containing a mixture of these compounds.

The alkali metal salts appropriate for this purpose include the acetates or formates of both sodium and potassium, or mixtures of them, and certain advantages appear in the use of sodium acetate or potassium formate over the other two compounds. In general, the concentrations of the salt required are of the order of 0.05% to 0.30% by weight of the vinyl resin, as compared to, and in conjunction with, from about 0.5% to 3.0% of the stearate.

In evaluating the advantages of the invention numerous tests have been made with various ratios of the components of the stabilizer mixture, as well as with different alkali salt and stearate ingredients. Samples of vinyl resin compositions into which the stabilizer mixture had been intimately and thoroughly dispersed were heated in a constant temperature oven at 135° C., and the time determined for progressive stages of deterioration, represented first by a discoloring sufficient to destroy the value of a translucent, transparent or definitely colored resin, and, secondly, by a total blackening of the resin composition. Other and similar samples were subjected to heat treatment by fluxing on a steam heated two-roll mill until a noticeable clouding of the resin occurred, the time required being taken as the limit of "cloud" stability. By duplicate tests with identical vinyl resins, and corresponding metal stearates as a stabilizer without the alkali salt addition, distinct advantages were proved to exist in the mixtures herein proposed, and substantially greater resistance to all three forms of deterioration were evident in the improved plastic compositions.

Representative time values obtained by the above experiments show, for example, that a vinyl resin formed by conjoint polymerization of vinyl chloride and vinyl acetate and containing about 85% to 87% vinyl chloride in the polymer, when stabilized with 1.4% lead stearate will withstand a temperature of 135° C. for 105 minutes before definite blackening occurs, whereas the same resin with similar lead stearate concentration in conjunction with 0.30% sodium acetate resists similar deterioration for 225 minutes. With 0.30% potassium formate substituted for the sodium acetate stability against blackening was maintained for 195 minutes. In similar comparisons with calcium stearate and cadmium stearate, 1% of each of these as the sole stabilizer showed time tests of 120 minutes and 55 minutes respectively, but when 0.30% sodium acetate was admixed with the stearate the corresponding time for blackening stability was raised to 195 minutes and 120 minutes, respectively. With reference to color and clouding stability the improvement effected by the stabilizer mixture is of still greater relative magnitude than the resistance afforded toward complete decomposition or blackening of the resin.

As previously indicated, an effective concentration of the alkali metal salt may vary within the approximate range 0.05% to 0.30% by weight of the resin. Higher percentages may be used and there is indication that stability progressively, but not constantly, increases with this salt concentration. However, the preferred higher limit should not be above the point at which the salt tends to impart a noticeable yellow coloring to the resin. The stearate salt concentration may also be selected to suit any particular resin grade and its conditions of compounding and use. Normally not over about 3.4% of the metal stearate is required and the ratio of the stearate to the adjuvant stabilizer should preferably be about 4. Specifically about 1.2% of the stearate in conjunction with about 0.30% of the alkali metal salt has shown especially good results.

It will be understood that sodium formate and potassium acetate will also effect improved stability, and while in not so marked a degree as sodium acetate and potassium formate, they may be highly desirable in certain resin compositions. Modifications in the salt component concentrations, as well as in other respects than those herein indicated, may be made within the scope of this invention, and in the compounding and processing of the stabilized vinyl resin, the usual solvents, plasticizers, coloring agents, and other modifying materials may be used without adversely affecting, to any substantial degree, the improvements herein disclosed. The invention should not be limited other than as defined in the appended claims.

I claim:

1. A heat stable resinous composition comprising a vinyl resin which contains a vinyl halide and a stabilizing material intimately dispersed therein, which stabilizing material comprises a mixture of a metal stearate and an alkali metal salt of a monobasic, monocarboxylic acid having not more than two carbon atoms to the molecule.

2. A heat stable resinous composition comprising a vinyl resin which contains a vinyl halide and a stabilizing material intimately dispersed therein, which stabilizing material comprises at least one of the group consisting of cadmium stearate, calcium stearate, and lead stearate, admixed with minor proportions of at least one of the group consisting of the acetates and formates of sodium and potassium.

3. A heat stable resinous composition comprising a vinyl resin which contains a vinyl halide and a stabilizing material intimately dispersed therein, which stabilizing material comprises at least one of the group consisting of the stearates of cadmium, calcium and lead, in an amount from about 0.5% to about 3.0% by weight of the resin, admixed with at least one of the group consisting of the acetates and formates of sodium and potassium in an amount from about 0.5% to about 0.3% by weight of the resin.

4. A heat stable resinous composition comprising a vinyl resin of the type formed by conjoint polymerization of a vinyl halide with a vinyl ester of an aliphatic acid, and a stabilizing material intimately dispersed therein, said material comprising a mixture of a metal stearate and at least one of the group consisting of the acetates and formates of sodium and potassium.

5. A heat stable resinous composition comprising a vinyl resin of the type formed by conjoint polymerization of vinyl chloride with vinyl acetate and containing about 60% to about 95% vinyl chloride in the polymer, and a stabilizing material intimately dispersed therein, said material comprising at least one of the group consisting of cadmium stearate, calcium stearate, and lead stearate admixed with minor proportions of at least one of the group consisting of the acetates and formates of sodium and potassium.

6. Process of producing heat stable resinous compositions which comprises intimately mixing a vinyl resin of the type formed by conjoint polymerization of vinyl chloride with vinyl acetate and containing about 60% to 95% vinyl chloride in the polymer, with a stabilizing material, said material comprising at least one of the group consisting of the stearates of cadmium, calcium and lead in an amount from about 0.5% to about 3.0% by weight of the resin, and at least one of the group consisting of the acetates and formates of sodium and potassium in an amount from about 0.5% to about 3.0% by weight of the resin.

7. A heat-stable resinous composition comprising a vinyl resin of the type formed by conjoint polymerization of vinyl chloride with vinyl acetate and containing about 60% to 95% vinyl chloride in the polymer, and a stabilizing material intimately dispersed therein, said material comprising at least one of the group consisting of cadmium stearate, calcium stearate and lead stearate, in an amount about 1.2% by weight of the resin, admixed with sodium acetate in an amount about 0.3% by weight of the resin.

KERMITH K. FLIGOR.

CERTIFICATE OF CORRECTION.

Patent No. 2,181,478. November 28, 1939.

KERMITH K. FLIGOR.

It is hereby certified that error appears in the printed specification of the above numbered patent, requiring correction as follows: Page 1, second column, line 43, for "1.4%" read 1.0%; page 2, first column, line 21, for "3.4%" read 3.0%; line 48, claim 1, for "moncarboxylic" read monocarboxylic; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.